US010589447B2

(12) United States Patent
Capobianco et al.

(10) Patent No.: US 10,589,447 B2
(45) Date of Patent: Mar. 17, 2020

(54) SYSTEMS AND METHODS FOR PRODUCING MATERIALS SUITABLE FOR ADDITIVE MANUFACTURING USING A HYDRODYNAMIC CAVITATION APPARATUS

(71) Applicant: Applied Cavitation, Inc., Goleta, CA (US)

(72) Inventors: Joseph Albert Capobianco, Marlton, NJ (US); Dana Lynn Hankey, Santa Barbara, CA (US); Marshall Campion Tibbetts, Goleta, CA (US)

(73) Assignee: Applied Cavitation, Inc., Goleta, CA (US)

( * ) Notice: Subject to any disclaimer, the term of this patent is extended or adjusted under 35 U.S.C. 154(b) by 554 days.

(21) Appl. No.: 15/302,740

(22) PCT Filed: Apr. 8, 2015

(86) PCT No.: PCT/US2015/024949
§ 371 (c)(1),
(2) Date: Oct. 7, 2016

(87) PCT Pub. No.: WO2015/157433
PCT Pub. Date: Oct. 15, 2015

(65) Prior Publication Data
US 2017/0028589 A1 Feb. 2, 2017

Related U.S. Application Data

(60) Provisional application No. 61/976,506, filed on Apr. 8, 2014.

(51) Int. Cl.
C08F 6/00 (2006.01)
B29B 13/10 (2006.01)
(Continued)

(52) U.S. Cl.
CPC ............... *B29B 13/10* (2013.01); *B01F 3/10* (2013.01); *B01F 3/2078* (2013.01);
(Continued)

(58) Field of Classification Search
CPC .......................................................... C08F 6/00
See application file for complete search history.

(56) References Cited

U.S. PATENT DOCUMENTS 6,506,245 B1   1/2003   Kinney et al.
2003/0134942 A1   7/2003   Lee et al.
(Continued)

FOREIGN PATENT DOCUMENTS

EP   1 645 381   7/2004
JP   2011-528988   7/2009
(Continued)

OTHER PUBLICATIONS

International Search Report & Written Opinion on PCT/US2015/024949 dated Jun. 30, 2015.
(Continued)

Primary Examiner — William D Young
(74) Attorney, Agent, or Firm — Foley & Lardner LLP

(57) ABSTRACT

Provided in one implementation is a method that includes introducing a volume of raw material into a chamber of a cavitation machine. The raw material can include a mixture comprising a powder and a solvent. The powder can have a first average particle size in the raw material. The method includes applying a hydrodynamic cavitation process to the raw material to produce a product material. The powder can have a second average particle size, smaller than the first average particle size, in the product material. The method includes causing the product material to exit the cavitation (Continued)

chamber and drying the product material to remove the solvent. Apparatus employed to apply the method are also provided.

16 Claims, 11 Drawing Sheets

(51) Int. Cl.
*B01F 3/20* (2006.01)
*B01F 15/06* (2006.01)
*B01F 5/06* (2006.01)
*B01F 3/10* (2006.01)
*B01F 11/00* (2006.01)
*D01D 5/00* (2006.01)
*D01F 1/02* (2006.01)
*B01F 15/02* (2006.01)
*B33Y 80/00* (2015.01)
*B01F 3/22* (2006.01)
*B02C 19/18* (2006.01)
*D01D 5/08* (2006.01)

(52) U.S. Cl.
CPC .......... *B01F 3/2215* (2013.01); *B01F 5/0685* (2013.01); *B01F 5/0688* (2013.01); *B01F 11/0074* (2013.01); *B01F 15/0237* (2013.01); *B01F 15/065* (2013.01); *B02C 19/18* (2013.01); *B33Y 80/00* (2014.12); *D01D 5/00* (2013.01); *D01F 1/02* (2013.01); *C08F 6/00* (2013.01); *D01D 5/08* (2013.01)

(56) References Cited

U.S. PATENT DOCUMENTS

| | | |
|---|---|---|
| 2005/0047993 A1 | 3/2005 | Moser et al. |
| 2007/0003497 A1* | 1/2007 | Holloway, Jr. ........ B01F 3/0807 424/59 |
| 2009/0003123 A1 | 1/2009 | Morrison, Jr. et al. |
| 2009/0045551 A1 | 2/2009 | Suetsugu et al. |
| 2009/0176957 A1 | 7/2009 | Pandit et al. |
| 2009/0176967 A1 | 7/2009 | Stennicke |
| 2010/0076120 A1* | 3/2010 | Emmerson ............... C08J 3/203 524/1 |
| 2012/0021497 A1 | 1/2012 | Larach |
| 2013/0203198 A1* | 8/2013 | Min ...................... H01L 51/428 438/46 |

FOREIGN PATENT DOCUMENTS

| | | |
|---|---|---|
| KR | 20030006069 | 7/2001 |
| KR | 100389658 | 10/2003 |
| WO | WO-2007/145918 | 12/2007 |

OTHER PUBLICATIONS

International Search Report for PCT/US2015/024949 dated Jun. 30, 2015.
Korean Notice of Final Rejection for application No. 10-2016-7031153.
Korean Notice of Preliminary Rejection (Non-Final)for application No. 10-2016-7031153 dated Jun. 21, 2017.
Supplementary European Search Report dated Oct. 10, 2017 regarding EP 15776513.

* cited by examiner

SYSTEMS AND METHODS FOR PRODUCING MATERIALS SUITABLE FOR ADDITIVE MANUFACTURING USING A HYDRODYNAMIC CAVITATION APPARATUS

RELATED APPLICATIONS

This application is a U.S. National Stage filing of International Application No. PCT/US2015/024949, filed Apr. 8, 2015, which claims priority from U.S. Provisional Application Ser. No. 61/976,506, filed Apr. 8, 2014, each of which is hereby incorporated by reference in its entirety.

BACKGROUND

Materials such as powders, inks, pastes, suspensions, and filaments can be used in additive manufacturing. Traditional powder and composite production processes use milling equipment such as rotary ball mills and mixing technologies such as ultrasonication. These techniques can be inefficient and can undesirably change the morphology of the material components, which can lead to inefficient packing of the particles in the raw material. Furthermore, for pure polymer systems, these processes can irreversibly damage the polymers.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method. The method can include preparing a raw material including a mixture comprising a polymer and a functional material selected based on at least one of a structural property, and electrical property, a thermal property, and an aesthetic property. The functional material can have a first average particle size in the raw material. The method can include heating a chamber of a cavitation machine to a first temperature selected to be greater than a melting temperature of the raw material. The method can include introducing a volume of the raw material into the chamber of the cavitation machine. The method can include applying a hydrodynamic cavitation process to the raw material to produce a product material. The functional material can have a second average particle size, smaller than the first average particle size, in the product material. The method can include forming the product material into a desired shape. The method can include cooling the product material to a second temperature selected to be lower than the melting temperature of the product material.

Another innovative aspect of the subject matter described in this disclosure can be implemented in a method. The method can include introducing a volume of raw material into a chamber of a cavitation machine. The raw material can include a mixture comprising a powder and a solvent. The powder can have a first average particle size in the raw material. The method can include applying a hydrodynamic cavitation process to the raw material to produce a product material. The powder can have a second average particle size, smaller than the first average particle size, in the product material. The method can include causing the product material to exit the cavitation chamber. The method can include drying the product material to remove the solvent.

Another innovative aspect of the subject matter described in this disclosure can be implemented in a method. The method can include introducing a volume of raw material into a chamber of a cavitation machine. The raw material can include a mixture comprising a dispersant, a binder, a carrier, and a functional material selected based on at least one of a structural property, and electrical property, a thermal property, and an aesthetic property. The functional material can have a first average particle size in the raw material. The method can include applying a hydrodynamic cavitation process to the raw material to produce a product material. The functional material can have a second average particle size, smaller than the first average particle size, in the product material. The method can include causing the product material to exit the cavitation chamber.

Another innovative aspect of the subject matter described in this disclosure can be implemented in an apparatus. The apparatus can include a first feed tube configured to contain a raw material. The apparatus can include a hydrodynamic cavitation chamber downstream from the first feed tube and configured to receive the raw material from the first feed tube. The apparatus can include a pressurizing element configured to push the raw material into an orifice of the hydrodynamic cavitation chamber to undergo a hydrodynamic cavitation process to form a product material. The apparatus can include a first heating element configured to apply heat to the first feed tube.

Another innovative aspect of the subject matter described in this disclosure can be implemented in a method. The method can include exposing a raw material having a first viscosity to a first pressure and a first temperature such that the raw material after the exposure has a second viscosity. The raw material can include particles including at least one functional material selected based on at least one of a structural property, and electrical property, a thermal property, and an aesthetic property. The second viscosity can be sufficiently low for the raw material to be adapted for a hydrodynamic cavitation process. The method can include subjecting the raw material having the second viscosity to the hydrodynamic cavitation process to make a product material having a third viscosity. The raw material can be exposed to a second temperature while the raw material is subjected to the hydrodynamic cavitation process in the cavitation chamber.

Another innovative aspect of the subject matter described in this disclosure can be implemented in an apparatus system. The apparatus system can include a first feed tube configured to contain a raw material, which has a first viscosity and is to be supplied into a hydrodynamic cavitation chamber that is downstream and separate from the apparatus system. The apparatus system also can include a pressurizing element and a first heating element configured to create a condition having a first pressure and a first temperature sufficiently high to reduce the first viscosity to a second viscosity being sufficiently low for the raw material to be pushed into an orifice of the hydrodynamic cavitation chamber to undergo a hydrodynamic cavitation process to form a product material.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
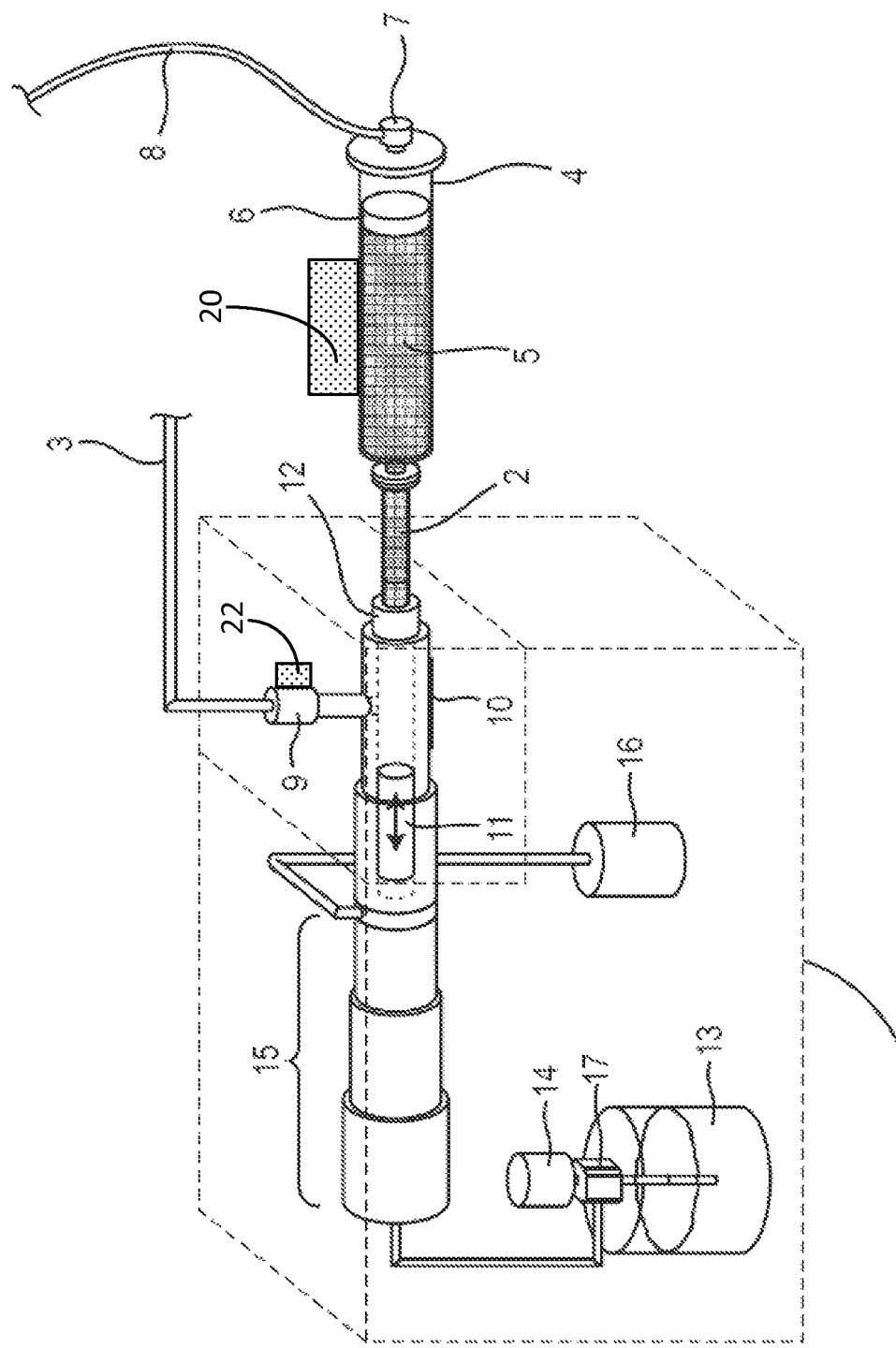
FIG. 1 provides a schematic of an example cavitation or emulsifying machine, according to an illustrative implementation.

Following below are more detailed descriptions of various concepts related to, and implementations of, systems and methods for producing materials suitable for additive manufacturing using a hydrodynamic cavitation apparatus. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Cavitation

Cavitation may refer to the formation of vapor cavities in a liquid (e.g., small liquid-free zones such as "bubbles" or "voids") that are formed as a result of forces acting upon the liquid. The process generally may occur when a liquid is subjected to rapid changes of pressure that cause the formation of cavities where the pressure is relatively low. When subjected to higher pressure, the voids may implode and may generate an intense shockwave. Depending on the application, any suitable mode of cavitation may be employed in the methods and systems provided herein. For example, the cavitation process in one implementation may involve, or be, hydrodynamic cavitation.

Hydrodynamic cavitation may refer to a process of vaporization, bubble generation, and bubble implosion, which occurs in a flowing liquid as a result of a decrease and subsequent increase in pressure. Hydrodynamic cavitation may be produced by passing a liquid through a constricted channel at a specific velocity or by mechanical rotation of an object through a liquid. In the case of the constricted channel and based on the specific (or unique) geometry of the system, the combination of pressure and kinetic energy may create the hydrodynamic cavitation cavern downstream of the local constriction generating high energy cavitation bubbles.

Orifices and venturi tubes may be used for generating cavitation. A venturi tube may be employed because of its smooth converging and diverging sections, such that that it may generate a higher velocity at the throat for a given pressure drop across it. On the other hand, an orifice may accommodate more numbers of holes (larger perimeter of holes) in a given cross sectional area of the pipe. Both options are possible.

Some of the pre-existing cavitation systems utilize opposing water jets to create the pressure needed for cavitation to occur while others create the pressure and resulting vacuum by having hydraulic pumps driving and oscillating plungers which draw the low viscosity materials in and then pushes the low viscosity material through the specific point where cavitation occurs. However, none of these pre-existing systems is equipped to handle a raw material that has a viscosity larger than that of a fluid, to disperse the constituents, or to attain the desired particle size distribution through de-agglomeration.

Additive Manufacturing

Additive manufacturing, also referred to as three dimensional (3D) printing, is a process for constructing three dimensional solid objects from a digital model. The process is considered additive manufacturing because the product is constructed through successive layer depositions to its final shape. Subtractive processes such as traditional machining, cutting, drilling, grinding typically are not utilized. Generally, additive manufacturing is subdivided into three techniques: stereolithography, fused filament fabrication, and selective laser sintering. Each of these techniques can make use of a different type of raw material. As discussed further below, raw materials suitable for all of these techniques can be produced using a hydrodynamic cavitation process.

Stereolithography is an additive manufacturing process which employs a liquid raw material to produce a product. Specifically, a vat of liquid ultraviolet curable photopolymer resin and an ultraviolet laser are used to build sequential layers of the product. For each layer, the laser beam traces a cross-section of the part pattern on the surface of the liquid resin. Exposure to the ultraviolet laser light cures and solidifies the pattern traced on the resin and joins it to the layer below. The first layer can be supported on an elevator platform within the vat of liquid.

After the pattern has been traced, the elevator platform descends by a distance equal to the thickness of a single layer, which can be in the range of about 0.05 millimeters to 0.15 millimeters. Then, a resin-filled blade can sweep across the cross-section of the part to coat it with fresh material. On this new liquid surface, the subsequent layer pattern is traced by the laser, thereby joining the layer to the previous layer. These steps can be repeated until the complete product is formed.

In fused filament fabrication, the product or part is produced by extruding small beads of thermoplastic polymers (or thermoplastic polymer composites) from a nozzle. A filament of raw material is unwound from a coil and supplies the raw material to an extrusion nozzle at a controlled rate. The nozzle can be heated to soften the raw material of the filament as it is extruded. The nozzle can be moved in both horizontal and vertical directions by a numerically controlled mechanism. The nozzle follows a tool-path controlled by a computer-aided manufacturing software package, and the part is built from the bottom up, one layer at a time.

Selective laser sintering works similarly to stereolithography, with key distinct differences. First, instead of liquid photopolymer in a vat, the raw material used for selective laser sintering is a bed layer containing powdered materials, such as polystyrene, ceramics, glass, nylon, and metals including steel, titanium, aluminum, and silver. The bed preheats the powders to a specified temperature while a high power laser is rastered across the surface to selectively fuse small particles of plastic, metal, ceramic, or glass powders into a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by a distance equal to the thickness of one layer, a new layer of raw material is applied on top, and the process is repeated until the part is completed. When the laser hits the powder, the powder is fused at that point, for example by sintering. All unsintered powder remains as is, and can become a support structure for the object.

The raw materials (i.e., inks, pastes, filaments, etc.) can be improved by effectively breaking up agglomerates to reduce the average particle size of the raw material. Furthermore, effectively dispersing the functional filler materials within the raw materials can result in more uniform raw materials. As described below, a hydrodynamic cavitation process can be used to produce raw materials for additive manufacturing having small average particle sizes and complete dispersion.

Cavitation Equipment

Depending on the application, any suitable equipment capable of carrying out a cavitation or an emulsifying process may be employed to produce materials for additive manufacturing. FIG. 1 provides a schematic of an example cavitation or emulsifying machine 1, according to an illustrative implementation. The machine comprises an inlet 2 and an outlet 3. The machine 1 may be a commercially available cavitation machine or may be a custom-designed cavitation machine. For example, in some implementations, the cavitation machine 1 may be a DeBEE 2000 cavitation machine produced by BEE International or an M-110P cavitation machine produced by Microfluidics. The apparatus system provided herein configured to feed the raw material into the base cavitation machine 1 may refer to the system that is attached to the base cavitation machine 1, such as at the inlet 2 thereof. Alternatively, the apparatus system provided herein may refer to a fabrication system comprising a combination of both the base cavitation machine 1 and the attached system, as shown in FIG. 1.

Referring to FIG. 1, the apparatus system may comprise at least one feed tube 4, a raw material 5 inside the feed tube 4, and a piston 6 that pushes the material down the feed tube 4, forcing it into the inlet 2 of the machine 1. The apparatus system may also comprise an air valve 7 on the back end of the feed tube 4, which air valve 7 controls the flow of compressed air into the feed tube 4. The apparatus system may comprise an air line 8, which feeds compressed air into the air valve 7 and into the feed tube 4 from a source of compressed air.

The base cavitation machine 1 may include any suitable components, depending on the application. For example, the base cavitation machine may include two hydraulic pumps which are utilized to push the paste through a very small orifice, into a very small vacuum chamber, and out another very small orifice that creates a specific desired back pressure. In one implementation, this combination of small orifices with a vacuum chamber in the middle is where the hydrodynamic cavitation occurs. In some implementations, the cavitation machine may include other components configured to introduce raw material through the very small orifice. For example, the cavitation machine may include components configured to inject or push the raw material through the very small orifice without the use of hydraulic pumps or pistons.

The base cavitation machine 1 also includes a hydraulic reservoir 13, a motor 14, which runs a pump 17, to pump the hydraulic oil up to an intensifier 15, which drives the oscillating plunger 11 that pushes the material up into the cavitation chamber 9, while the ball check system 12 closes to allow the material to be forced into the cavitation chamber 9, where the orifices are housed and the cavitation takes place. As the intensifier 15 pushes the plunger 11 forward, hydraulic oil in the front of the intensifier 15 is pushed against a nitrogen bag 16. After the plunger 11 in a fully actuated position, a positioning sensor stops the hydraulic pump 17 from driving the intensifier 15, and the pressure accumulates against the nitrogen bag 16, causing the plunger 11 to be pushed back to its starting position.

Depending on the application, the setups, including the number of feed tubes, may be varied. In one implementation, a small single feed tube containing the raw material may be employed for small batches that may be tested after each pass through the cavitation machine. The cavitation machine 1 also can include a first heating element 20 configured to apply heat to the feed tube 4 and a second heating element 22 configured to apply heat to the cavitation chamber 9. In some implementations that the cavitation machine 1 may include only the first heating element 20. In other implementations, the cavitation machine 1 may include only the second heating element 22. In other implementations, the cavitation machine 1 may include both the first heating element 20 and the second heating element 22. In some implementations, the first heating element 20 and the second heating element 22 can be resistive heaters or heating wraps that are positioned on the feed tube 4 and the cavitation chamber 9, respectively. The heating elements 20 and 22 can be configured to bring the temperature of the raw material within the cavitation machine 1 within the range of about zero degrees Celsius to about 700 degrees Celsius. In some implementations, the heating elements can be configured to bring the raw material to a temperature in the range of about 50 degrees Celsius to about 100 degrees Celsius above its glass transition temperature.

In other implementations, other types of heating elements may be used. For example, focused radiant energy (e.g., microwave, infrared, radio wave, etc.) can be used to implement the first heating element 20 and the second heating element 22. In other implementations, the heating elements 20 and 22 can be formed from immersion type systems, in which the portions to be heated are enclosed in a chamber such as a furnace to prepare a "water jacket." The chamber can contain a solid, liquid or gas which conforms to the shape of the sections of the cavitation machine 1 to be heated. In some implementations, using a secondary material can facilitate more precise temperature control, because the temperature can remain substantially constant during a phase transition, such as melting or boiling, in some implementations, the chamber can also have a "Russian doll" configuration where an outer chamber such as a furnace encloses a smaller chamber, which contains the solid, liquid or gas medium surrounding the heated section of the cavitation system. Common gases used in such a system can include, air, nitrogen, noble gases, steam, etc. Common liquids can include water, solvents with relatively high boiling points, or molten materials such as plastic or metal. In some implementations, solid materials such as thermally conductive powders can be used to conform to the shape of the cavitation machine 1 without melting. In still other implementations, the chamber can be heated using gas and/or electric heating elements. The heat can be transmitted from the furnace to the surrounding solid, liquid or gas via convection, conduction and/or radiation. Likewise, the heat will be transmitted to the cavitation machine via these mechanisms.

In some implementations, additional heating elements may be used. For example, it may be desirable to heat additional sections of the cavitation machine other than the sections that are shown in contact with the heating elements 20 and 22. Such additional heating elements also can be implemented using any of the techniques discussed above, including conventional heating jackets, printed thick film resistive heaters, or other heating techniques that make use of conduction, convection, and/or radiation.

Figure 2:
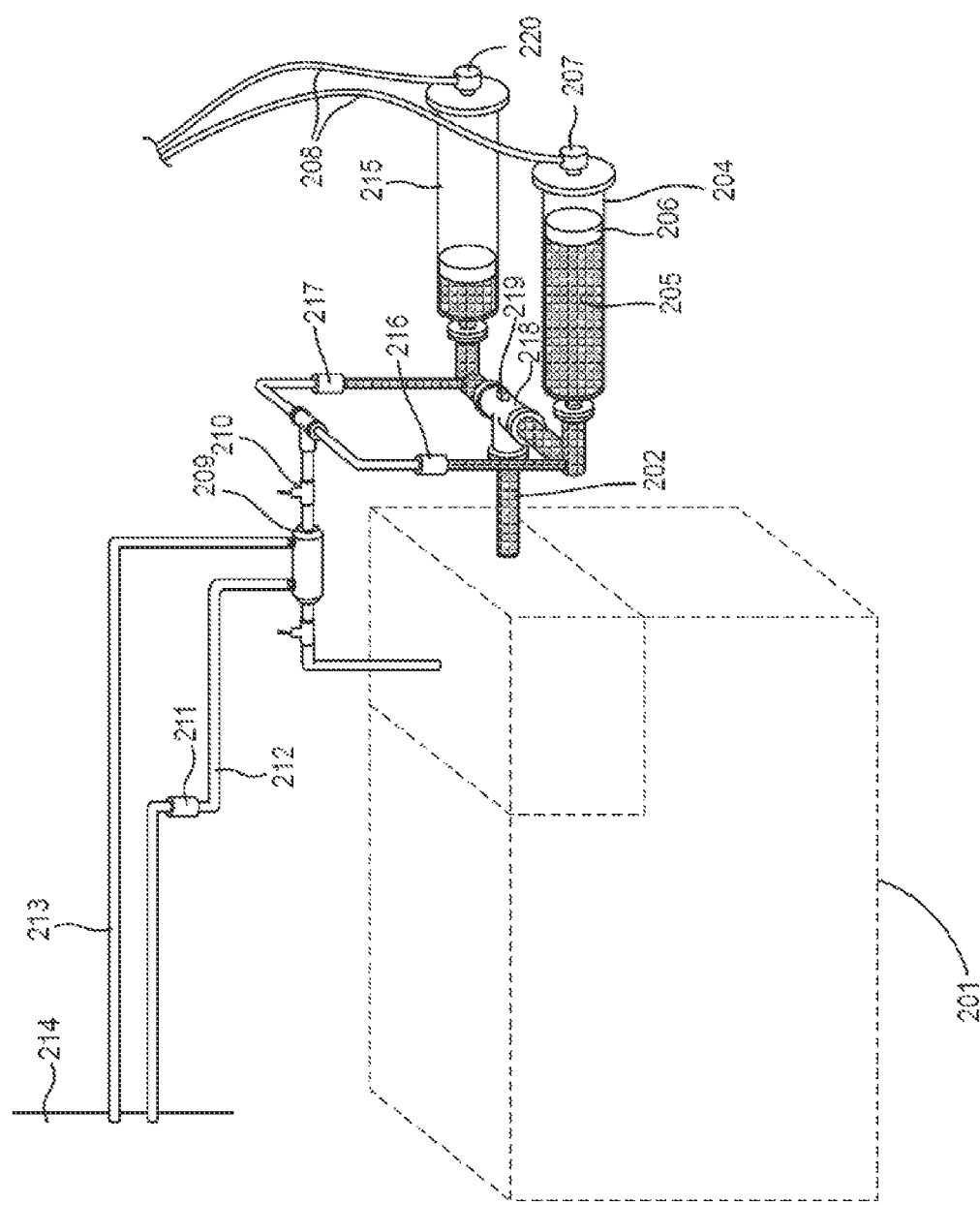
FIG. 2 provides a schematic of another example cavitation or emulsifying machine further including a thermal control system and a closed system that facilitates multiple cavitation passes, according to an illustrative implementation.

FIG. 2 provides a schematic of another example cavitation or emulsifying machine 201 further including a thermal control system and a closed system that facilitates multiple cavitation passes, according to an illustrative implementation. The thermal control system may comprise a heat exchanger 209 inline directly after the material exits the cavitation process. The heat exchanger 209 may be followed (downstream) by a thermal couple 210, which is configured to read the temperature of the material after the material has passed the heat exchanger 209. Chilled water may be applied to the heat exchanger using at least a water valve 211, which allows water to flow from a chilled water source 214 to the heat exchanger 209 via water tubing 212 through the heat exchanger 209, then out of the heat exchanger 209 and back to the return water connection of the chilled water via water tubing 213. Although not shown in FIG. 2, the thermal control system also can include heating elements positioned in contact with the tubes 204 and 215 (similar to the heating element 20 shown in FIG. 1), as well as a heating element positioned in contact with the cavitation chamber.

The flow of the water may be controlled manually or automatically, such as by a software program. In one implementation, a predetermined temperature may be inputted into a software program that, when executed, causes at least one processor to execute the thermal control system. In another implementation, the feedback from the thermal couple 210 may enable the software to adjust the water valve 211 such that the temperature of the material exiting the thermal control system is within a desired range. In some implementations, the system can include additional thermal couples to measure the temperature of the material in the system at other areas. For example, additional thermal couples can be configured to measure temperatures of the material going into the three-way valve 218, the temperature of the material exiting the cavitation chamber, and the temperature of the material exiting the heat exchanger 209. Outputs from all of these thermal couples may be used to control the flow of chilled water or the application of heat using heating elements such as the heating elements 20 and 22 shown in FIG. 1. In one implementation, the material is processed in a single discrete pass. The tubes are then interchanged and the process may be repeated for as many passes as needed to achieve the desired product material properties.

Also shown in FIG. 2 is a closed system that allows and/or facilitates multiple cavitation passes. The closed system, which is further downstream from the thermal control system, may further comprise a second feed tube; a plurality of two-way valves and three-way valves configured to resupply the product material back into the hydrodynamic cavitation chamber to repeat the hydrodynamic cavitation process; and two pressure transducers. This implementation may be suitable for a larger-scale production than the smaller (e.g., R&D) implementation described above. One benefit of the closed system described herein is mitigation (such as complete elimination) of exposure to contamination (e.g., air).

The closed system comprises two-way valves 216 and 217, which control the direction of the material when it is being pushed into the system, as well as the direction the material travels after it exits the heat exchanger 209. The system may further comprise a three way valve 218, which is desirably in sync with the two-way valves 216 and 217 in order for the material to travel into the cavitation machine 201. In one implementation, when the material in tube 204 is forced down the tube by the air driven piston 206, the two-way valve 216 must be closed so that the material travels past that valve and to the three-way valve 218. When the material is in tube 204, the three-way valve 218 allows the material to travel from tube 204 into the cavitation machine 1.

After cavitation takes place, the material travels through the thermal control system and out of the heat exchanger 209, and past the thermal couple 210. At this point, the material then travels through the open two-way valve 217 and then into tube 215, pushing the air-driven piston down the tube towards the back of the tube where the air valve 220 supplies air to the piston in tube 215. During this process of moving the material from tube 204 to tube 215, the air valve 220 is open so that air is able to be pushed out of tube 215 as it fills with material and the piston 206 is forced towards the back of tube 215. When tube 204 is empty, the piston 206 inside hits the front of tube 204, and there is no more pressure on the material being forced into the machine. In some implementations, the pressure within the system can be controlled to be maintained within a range of about 200 PSI to about 45,000 PSI, depending on the properties of the raw material being processed.

A pressure transducer 219, which is located near the inlet of the machine by the three-way valve, may transmit this drop in pressure to a software, which then causes at least one processor to switch the two-way valves and three-way valves so that the material will travel from tube 215 back through cavitation machine 201 and back into tube 204. Once the valves have switched (217 closed, 216 open, and 218 switched) so that material travels from tube 215 into cavitation machine 201, the air valve 220 may automatically turn on and force the piston 206 and the material down tube 215 through the entire process and back to tube 204.

An operator or user may choose the number of times the material will pass through the cavitation machine 201, thereby repeating the cavitation and/or cooling processes (by the thermal control system). In one implementation, after the pre-determined number of passes is achieved, the system, as well as the air driving the valves and pistons, may automatically shut off. This safety feature may release the air pressure once the current cycle is completed. In one implementation, the system setups described herein allow samples of the material to be taken at any time to determine if the desired results have been achieved after a certain number of passes at the desired operating pressure(s) and temperature(s).

In one implementation, the apparatus systems provided herein may control the temperature of the material by at least one of software and several thermal couples used to determine the temperature of the material at several points in the process and actuate a water valve, which controls the heating elements and as well as the flow of chilled water to the heat exchanger put inline directly after the cavitation takes place. In one implementation, the material is cooled after cavitation to reduce the temperature to a range that is suitable for the material being processed so that it remains stable and ready for the next cycle or pass. In some implementations, the thermal control system can control the heating elements and the water valve such that a thermal degradation temperature of the material is not exceeded. As discussed above, the machine 201 may be used to process various materials that can be used in additive manufacturing processes, such as pastes, powders, and filaments. In some implementations, when the machine is used to process a paste, the temperature of the raw material can be maintained in the range of about 10 degrees Celsius to about 50 degrees Celsius. For processing thermoplastics in the absence of solvent, the temperature of the raw material in the machine 201 can be controlled to be about 25 degrees Celsius to about 100 degrees Celsius above the glass transition temperature of the polymer in the raw material. In some implementations, higher temperatures may be necessary for raw materials having a greater molecular weight or raw materials including branched polymers. Thus, in some implementations, the temperature of the raw material in the machine 201 can be controlled to be within a range of about zero degrees Celsius to about 700 degrees Celsius, depending on various properties of the raw material.

Without the temperature control system shown in FIG. 2, the material in at least one implementation may retain too much heat and may gain even more heat energy though each pass, resulting in damaging some of its constituents. When the material is processed with set parameters for pressure and temperature, which may be determined for each material through trial and errors and/or parametric studies, the consistency of the product from lot to lot is surprisingly far superior to any other pre-existing process for preparing medium to high viscosity inks, pastes, slurries or dispersions of nano-particles. The ability to move medium to high viscosity materials in a continuous and controlled manner through the cavitation process by the apparatus systems and methods described herein is unexpected over the pre-existing methods.

Figure 3A:
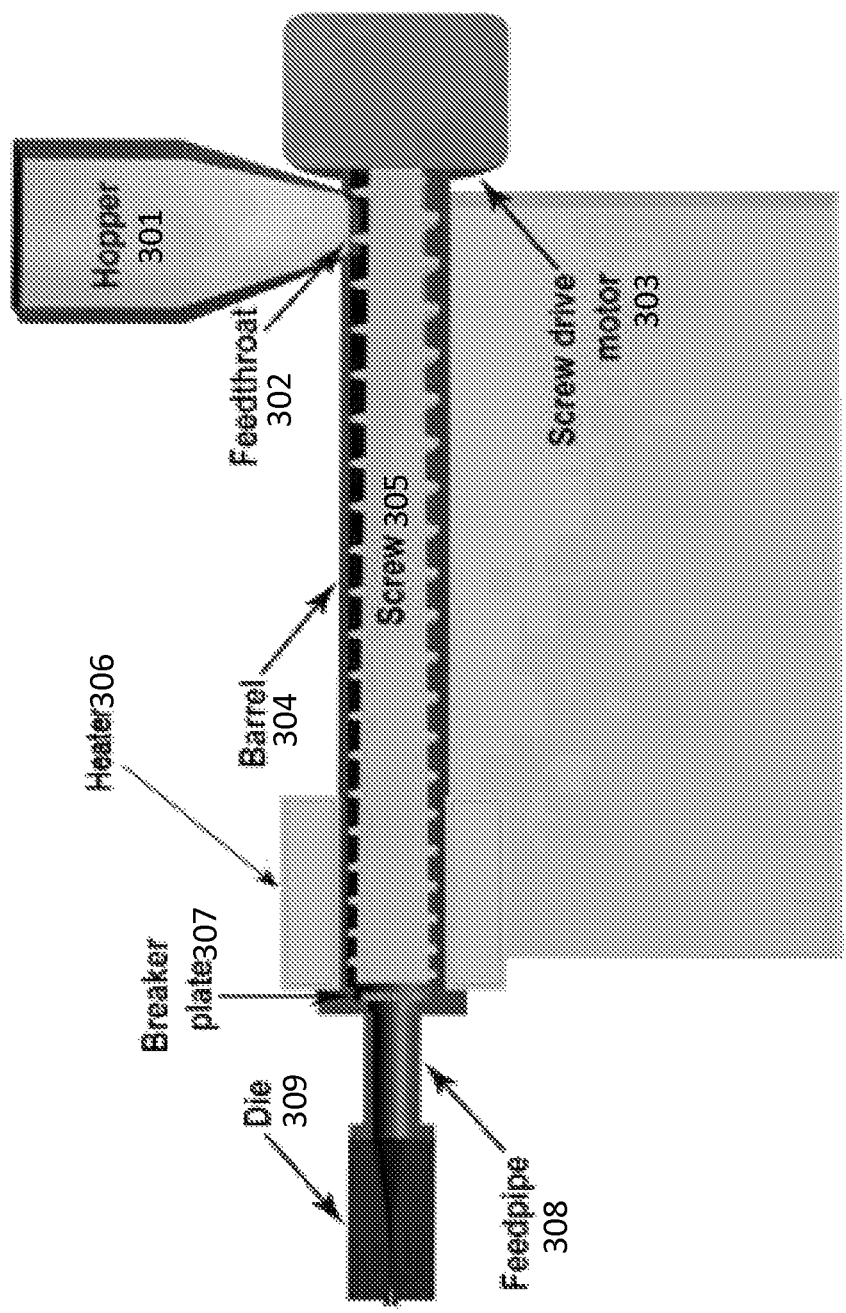
FIGS. 3A-3E provide schematics of example extruders, according to illustrative implementations.

FIGS. 3A-3E provide schematics of example extruders, according to illustrative implementations. Referring to FIG. 3A, an extruder 300 can be used to a form a cavitated material into various shapes, such as filaments that can be used in a fused filament fabrication process. Material is passed from a hopper 301 through a feedthroat 302 into a barrel 304. A screw drive feedthroat 303 turns a screw 35 within the barrel 304, thereby pushing the material through the barrel 304 towards a heater 306. The material can soften and melt as a result of the heat applied by the heater 306. The material is pushed through a breaker plate 307, which can help to filter the material, and into a feedpipe 308. Finally, the material passes through a die 309 that is configured to form the material into a desired shape. In some implementations, the die 309 is configured to form the material into a filament having a predetermined diameter. In other implementations, the die 309 can be used to form the material into a hollow tube or a sheet. In some implementations, the material can be cooled to a temperature below its melting temperature after passing through the die 309.

In some implementations, an apparatus system can include both a cavitation machine (such as the cavitation machines shown in FIGS. 1 and 2) and the extruder 300 shown in FIG. 3A. Product material that has been processed by the cavitation machine 1 can be fed into the hopper 301 of the extruder 300, and can be formed into a desired shape as described above. In other implementations, the cavitation machine 1 can replace portions of the extruder 300. For example, the cavitation machine 1 can replace the hopper 301, the feedthroat 302, the screw drive feedthroat 303, and barrel 304, the screw 35, and the heater 306. The product material can be heated and pressurized within the cavitation machine 1 and pushed directly through the breaker plate 307, into the feedpipe 308, and through the die 309. Thus, the pressure of the cavitated product material could be used to force the product material through the extruder 300. In some implementations, the die 309 could receive the product material from a container attached to the cavitation machine. For example, the extruder 300 could be mounted to the cavitation machine. In some implementations, the extruder could be mounted to the cavitation machine at a point between the high pressure cylinder 10 and the cavitation chamber 9 shown in FIG. 1. Such a configuration can be useful in implementations in which the product material is under high pressure. In some other implementations, the extruder 300 can be mounted to the cavitation machine at a point downstream from the cavitation chamber 9 shown in FIG. 1. Such a configuration can be useful in implementations in which the product material is under lower pressure. In some implementations, the extruder 300 can be a commercially available extruder available from manufacturers such as R&B Plastics, Davis Standard, Olympia, ESI, Plastic Machinery Equipment, Sterling, Farrel, Egan, and Polytruder.

Figure 3B:
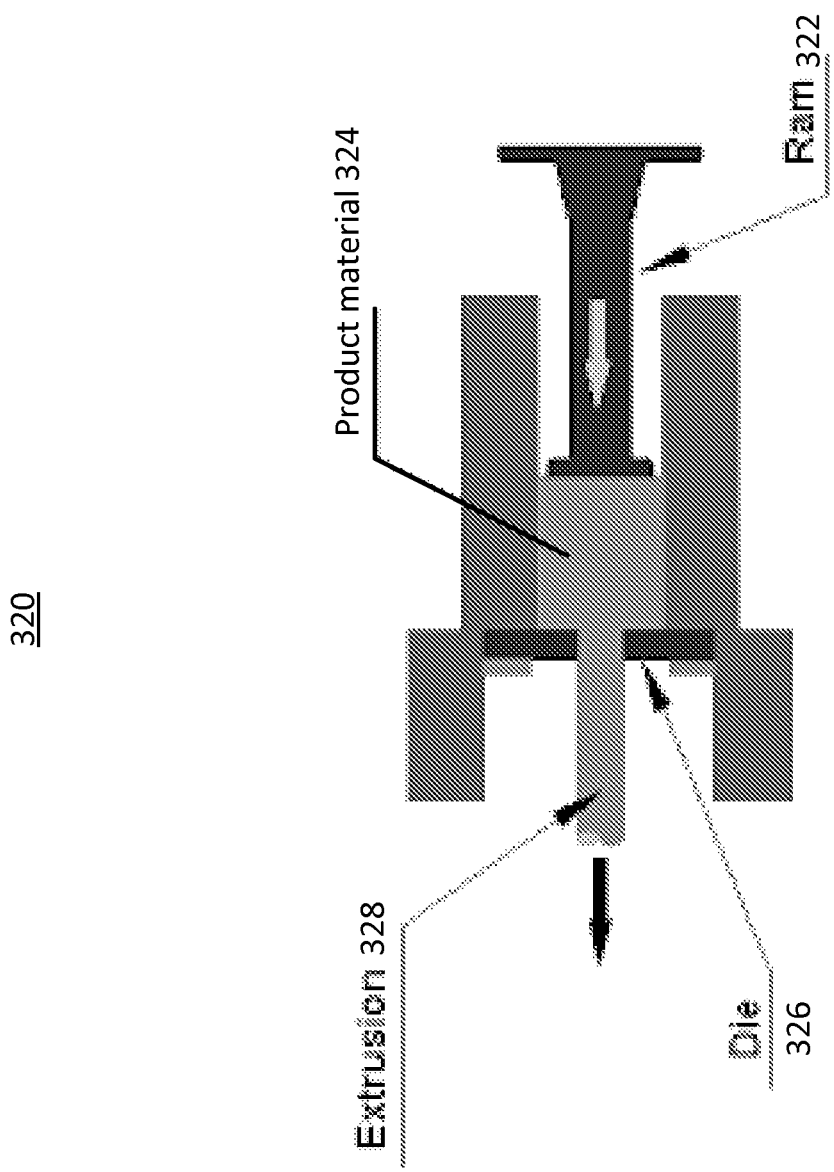

Various extrusion techniques can be used to form the product material into a desired shape. Shown in FIG. 3B is an example extruder 320 that can be used in a direct extrusion process. In direct extrusion, also referred to as forward extrusion, a ram 322 pushes the product material 324 through the die 326 to form the extruded shape 328. The ram 322 serves a purpose similar to that of the screw 305 shown in FIG. 3A. During this process, sliding of the product material 324 is against a stationary container wall. As a result, friction between the container and product material can be high. A dummy block of slightly lower diameter than the product material diameter can be used in order to prevent oxidation of the product material in hot extrusion. Hollow sections, such as tubes, also can be extruded using direct extrusion, as described further below.

Figure 3C:
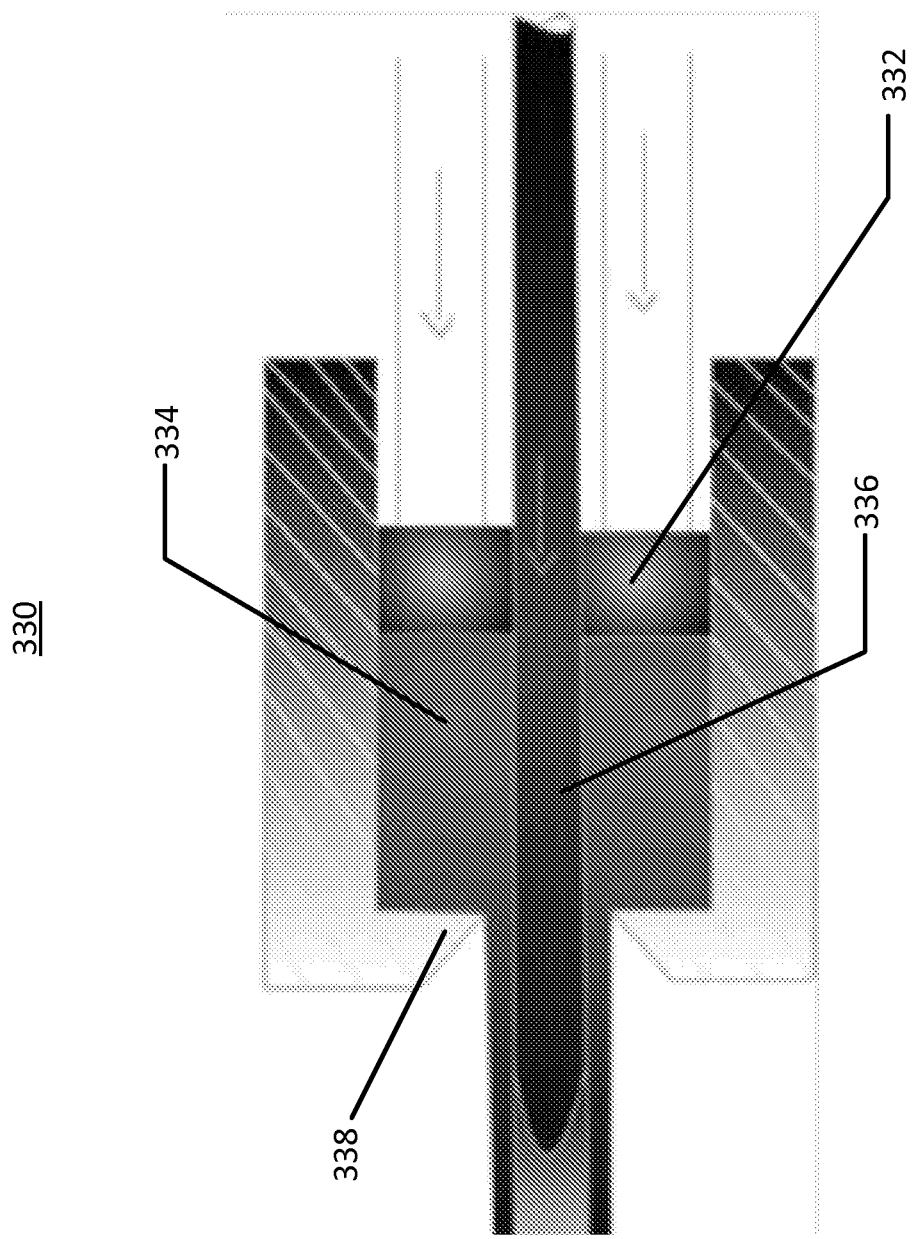

FIG. 3C shows an example extruder 330 that can be used to form the product material into a hollow extruded shape. The product material 334 is formed into a hollow shape around a mandrel 336. As the ram 332 pushes the product material 334 and the mandrel 336 through the die 338, the product material 334 is formed into a hollow shape that coats the mandrel 336. The mandrel 336 extends up to the entrance of the die 338. The clearance between the mandrel 336 and the wall of the die 338 determines the wall thickness of the extruded tube. The mandrel 336 is made to travel along with the ram 332 in order to make concentric tubes by extrusion. Additionally, the mandrel 336 can be a material which is to be coated by the product material 334. This method is sometimes referred to as overjacket extrusion. In some other implementations, the mandrel 336 can later be removed, resulting in a hollow extruded shape.

Figure 3D:
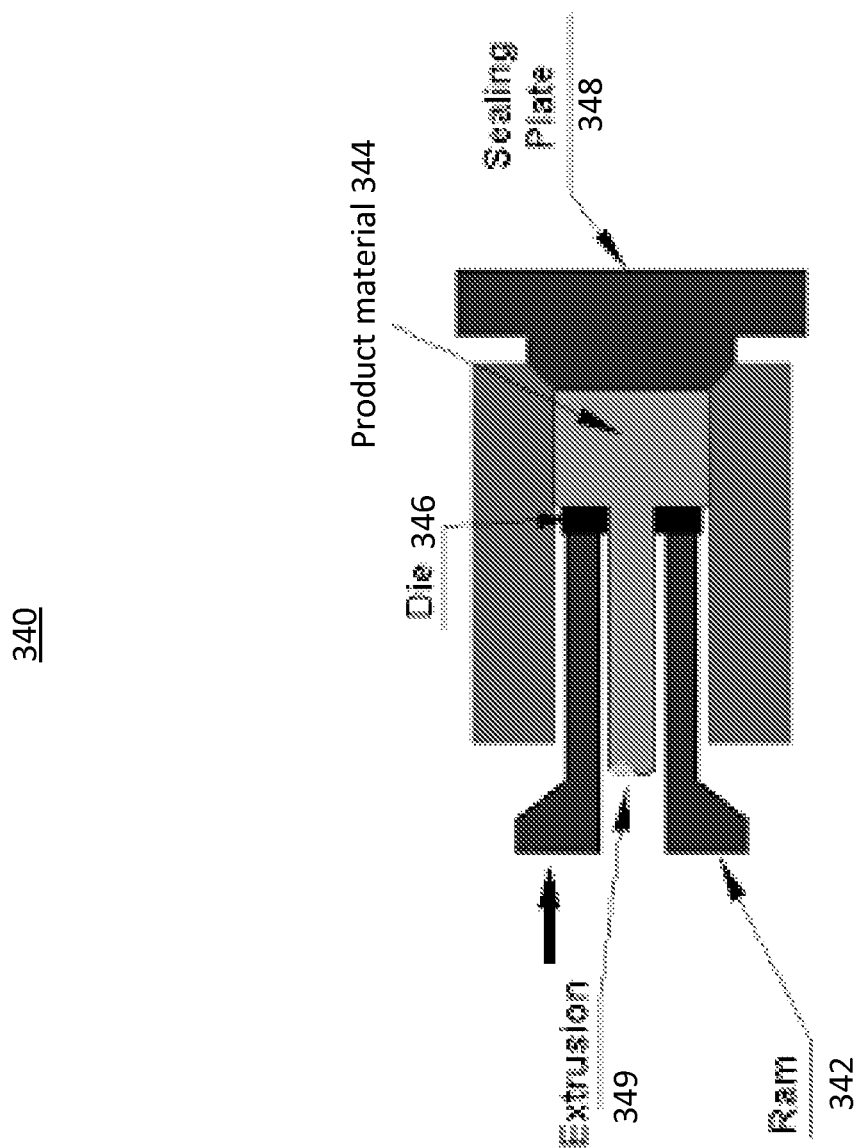

FIG. 3D shows an example extruder 340 that can be used in an indirect extrusion process. Indirect extrusion, also referred to as backward extrusion, is a process in which the ram 342 moves in a direction opposite to that of the product material 344 to form the product material 344 into the extruded shape 349. Thus, there is no relative motion between container and product material 344. There is also less friction and hence reduced forces can be required for indirect extrusion, relative to direct extrusion. For extruding solid pieces, a hollow ram such as the ram 342 shown in FIG. 3D is required. For hollow extrusion, the product material 344 can be forced through the annular space between a solid ram and the wall of the container.

Figure 3E:
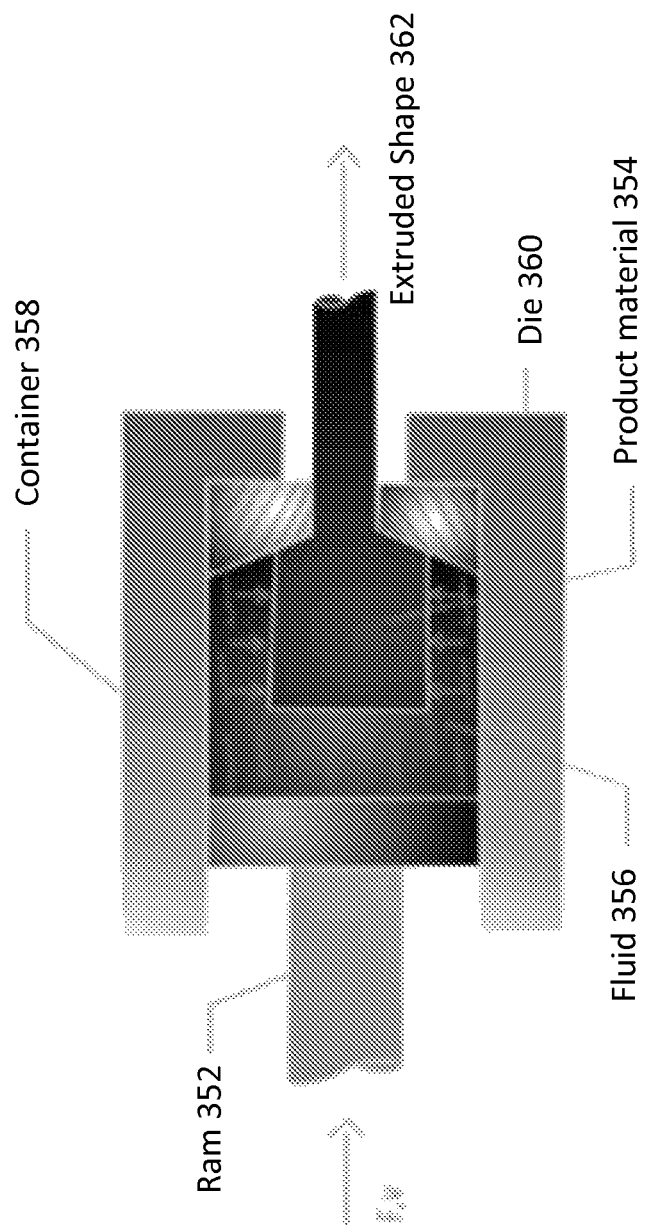

FIG. 3E shows an example extruder 350 that can be used in a hydrostatic extrusion process. In hydrostatic extrusion, the container 358 is filled with a fluid 356. Extrusion pressure is transmitted through the fluid to the product material 354. Friction can be eliminated in this process because there is no contact between the product material 354 and the wall of the container 358. As a result, brittle product materials can be extruded using this process. In some implementations, highly brittle product materials can be extruded into a pressure chamber. Pressure is limited by the strength of the container 358, the ram 352, and the die 360. Vegetable oils such as castor oil can be used as the fluid 356. In some implementations, this process can be carried out at room temperature. In some implementations, techniques other than extrusion also can be used to form the product material into a desired shape. For example, injection molding, slot die coating, or machining of the product material can be used for achieve the desired shape.

As discussed above, in some implementations a cavitation machine such as the cavitation machines shown in FIGS. 1 and 2 can be connected to an extruder, such as the extruders shown in FIGS. 3A-3E. In some implementations, the cavitation machine can replace some of the components of the extruder. For example, the product material can be under high pressure as a result of the cavitation process, and this pressure can serve to push the product material through the extrusion die, rather than using a ram or screw to push the product material through the extrusion die. In some implementations, the die can be welded, swage locked, or screwed onto an extrusion container, and the container can be welded, swage locked, or screwed onto the cavitation machine.

Figure 4:
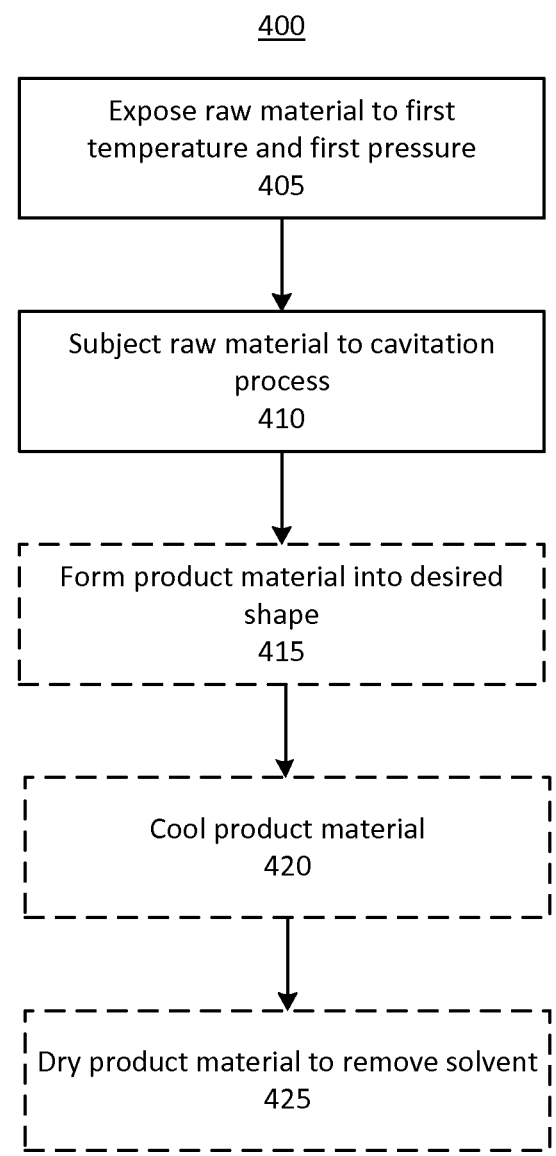
FIG. 4 provides a schematic flowchart illustrating an example fabrication process, according to an illustrative implementation.

FIG. 4 provides a schematic flowchart illustrating an example fabrication process 400, according to an illustrative implementation. In some implementations, the process 400 can be used to produce a powdered material for use in selective laser sintering manufacturing, an ink or paste for use in stereolithography, or a filament for use in fused filament fabrication. In brief overview, the process 400 includes exposing a raw material to a first temperature and a first pressure (stage 405) and subjecting the raw material to a cavitation process to produce a product material (stage 410). The process 400 also can include the optional steps of forming the product material into a desired shape (stage 415), cooling the product material (stage 420) and/or drying the product material to remove solvent (stage 425).

Still referring to FIG. 4, and in greater detail, the process 400 includes exposing a raw material having a first viscosity to a first temperature and a first pressure such that the raw material after the exposure has a second viscosity (stage 405). The raw material can be loaded into an engineered cavitation feed tube, which is attached to a cavitation machine such as the cavitation machines shown in FIGS. 1 and 2. A piston in the feed tube can then be driven down the feed tube, compressing the raw material to achieve the first pressure. In some implementations, a heating element in contact with the feed tube can be used to achieve the first temperature.

The raw material may comprise a plurality of particles. The particles may have any geometry, including any shapes and sizes. For example, the particles may have a shape that comprises a sphere, a sheet, a flake, a frit, an ellipsoid, or an irregular shape. The particle may be of any size. The term "size" referred to herein may refer to the diameter, radius, length, width, height, etc., depending on the context and geometry of the particle. When the term "size" is used to describe a plurality of particles, the size may refer to an average size of the plurality.

In some implementations, the raw material can include a functional material selected based one or more structural, electrical, thermal, and aesthetic properties. For example, functional materials that are electrically insulating (i.e., ceramics) or electrically conductive (i.e., metals) can be useful for preparing a paste to be used in the manufacture of an electronic device. The functional material also can be selected based on its color, yield strength, tensile strength, or any other material property that may be relevant for the part to be formed from the resulting product material using stereolithographic fabrication.

The functional material can have a first average particle size in the raw material. In some implementations, the primary particle size of the functional material in the raw material can be in the range of about 1 nanometer to about 100 microns. However, due to agglomeration, the average particle size of the functional material in the raw material can be significantly greater than the primary particle size of the functional material in the raw material.

Figure 5A:
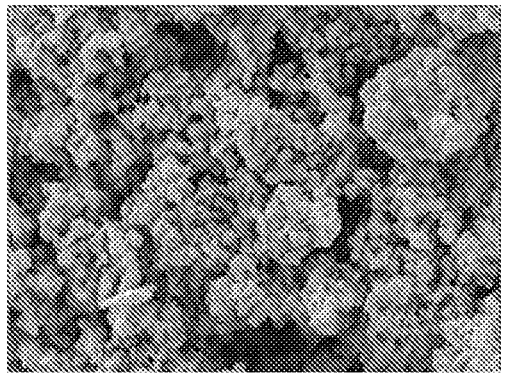
FIGS. 5A and 5B provide microscopy images of silver particles prior to a cavitation process (5A) and after a cavitation process (5B), according to an illustrative implementation.
Figure 6A:
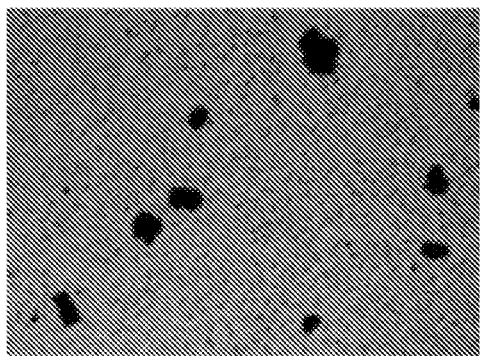
FIGS. 6A and 6B provide microscopy images of silica particles prior to a cavitation process (6A) and after a cavitation process (6B), according to an illustrative implementation.

Referring to FIG. 5A, a microscopy image of a raw material including silver powder is shown. As can be seen, the small silver particles are grouped into agglomerates whose average size is considerably larger than the average size of the primary silver particles. Similarly, FIG. 6A shows a micrograph of a raw material including silica particles. Several agglomerates (represented by large dark spots in the figure) can be seen. The examples of raw materials shown in FIGS. 5A and 6A are intended to be illustrative only, and many other functional materials can also can be used.

Referring again to the process 400 shown in FIG. 4, in some implementations, the functional material can include a powder and the raw material can further include a solvent. In some implementations, the raw material also can include one or more dispersants, one or more surfactants, and one or more fillers. For example, in some implementations, the process 400 can be applied to a raw material including a mixture of polymer and filler, or a polymer coated filler. In other implementations, the powder in the raw material can include a eutectic blend of mixed metals. In still other implementations, the powder in the raw material can include ceramic particles blended with metals, glasses, or polymers. The components of the raw material can be selected based on the ability of the powder to disperse and/or dry within the raw material.

Non-limiting examples of solvents that can be included within the raw material used in the process 400 include any of the following: polyethylene (pe), polypropylene (pp), polystyrene (ps), polyurethane (pu), polyvinyl acetate (pva), polyvinyl butyral (pvb), polyvinyl chloride (pvc), acrylonitrile butadiene styrene (abs) acrylics (pma, ibma, pbm, pmma), cellulosic (ethylcellulose, methlycellulose, hydroxyproplycellulose, etc.) celluloid cellulose acetate, polysaccharides (starches, chitosan, ha, etc.) polylactic acid (pla, plla), polyglycolic acid (pga) cycloolefin copolymer (coc), ethylene-vinyl acetate (eva), ethylene vinyl alcohol (evoh), fluoroplastics (ptfe, alongside with fep, pfa, ctfe, ectfe, etfe) ionomers, kydex, a trademarked acrylic/pvc alloy, liquid crystal polymer (lcp), polyacetal (pom or acetal) polyacrylates (acrylic) polyacrylonitrile (pan or acrylonitrile), polyamide (pa or nylon), polyimide (pi), polyamide-imide (pai), polyaryletherketone (paek or ketone), polybutadiene (pbd), polybutylene (pb), polybutylene terephthalate (pbt), polycaprolactone (pcl), polychlorotrifluoroethylene (pctfe), polyethylene terephthalate (pet), polycyclohexylene dimethylene terephthalate (pct), polycarbonate (pc), polyhydroxyalkanoates (phas), polyketone (pk), polyester, polyetheretherketone (peek), polyetherketoneketone (pekk), polyetherimide (pei), polyethersulfone (pes), polysulfonepolyethylenechlorinates (pec), polymethylpentene (pmp), polyphenylene oxide (ppo), polyphenylene sulfide (pps), polyphthalamide (ppa), polysulfone (psu), polytrimethylene terephthalate (ptt), polyvinylidene chloride (pvdc), poly (alkylene carbonate) copolymers and styrene-acrylonitrile (san).

Fillers that may be incorporated into the raw material used in the process 400 can include mixtures, compounds, alloys, and pure forms of base, precious, noble, rare earth, alkali, and transition metals. For example, any of the following elements can be used as a filler in the raw material: lithium, sodium, potassium, rubidium, cesium, francium, beryllium, magnesium, calcium, strontium, barium, scandium, titanium, vanadium chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, copernicium, aluminum, gallium, indium, tin, thallium, lead, bismuth, polonium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, lawrencium, germanium, arsenic, antimony, astatine, in particular, the following substances can be used as fillers in various implementations of the process 400: aluminum magnesium boride, aluminum oxide, aluminum oxynitride, aluminum nitride, barium strontium cobalt ferrite, barium titanate, beryllium oxide, bismuth strontium calcium copper oxide bismuth titanate, bone china, boron nitride, briquetage, calcium aluminates, calcium carbonate, calcium oxide, calcium phosphate, calcium titanate, cenosphere, ceramic colorants, ceramic flux, ceramic foam, ceramic matrix compos- ite, cerium hexaboride, cerium oxide (stabilized and pure), coade stone, crittersol, dysprosium titanate, earthenware, electroceramics, expanded clay aggregate, ferroelectric ceramics, fire clay, frit, fumed silica, geopolymer, geopolymer concrete, germanium dioxide, glass, glass-ceramic, grog (clay), hafnium diboride, hydroxyapatite, jesmonite, kaolin/kaolinite, lanthanum gallium silicate, lanthanum hexaboride, lanthanum strontium cobalt ferrite, lanthanum strontium manganite, lead oxide, lead scandium tantalate, lead zirconate titanate, lumicera, magnesium diboride, magnesium oxide, martensite, nile silt, magnesium oxide, magnesium titantate max phases, metal clay, molybdenum disilicide, mud, porcelain, paper clay, quartz, sea pottery, sialon, silica fume, silicon boride, silicon carbide, silicon dioxide, silicon nitride, silicon oxynitride, soapstone, solid solutions of ceramics, strontium titanate, tetragonal polycrystalline zirconia, titanium carbide, titanium dioxide, tube-based nanostructures, tungsten carbide tungsten disilicide, tungsten nitride, ultra-high-temperature ceramics, vitreous china, yttrium barium copper oxide, yttrium oxide, zinc oxide, zirconia toughened alumina, zirconium dioxide (pure and stabilized), titanium chromium, manganese The raw material also can include a fugitive material that can be removed after an additive manufacturing technique has been used to form a finished part, for example to achieve a desired degree of porosity in the finished part. Fugitive materials can include constituents which will degrade or can be removed without disrupting the surrounding matrix. For example, substances such as salts can be dissolved, while substances such as polysaccharides, carbon black, and graphite can be thermally decomposed or removed by other techniques.

Non-limiting examples of solvents that can be included within the raw material used in the process 400 include any of the following: acetic acid, acetone, acetonitrile, benzene, butanol, butyl acetate, carbon tetrachloride, chlorobenzene, chloroform, cyclohexane, 1,2-dichloroethane diethyl ether, diethylene glycol, diglyme (diethylene glycol dimethyl ether), 1,2-dimethoxy-ethane (glyme, DME), dimethylether dimethyl-formamide (DMF), dimethyl sulfoxide (DMSO), dioxane, ethanol, ethyl acetate, ethylene glycol, gamma butyrl lactone (GBL), glycerin, heptane, Hexamethylphosphoramide (HMPA), Hexamethylphosphorous triamide (HMPT), hexane, methanol, methyl t-butyl ether (MTBE), methylene chloride, N-methyl-2-pyrrolidinone (NMP), nitromethane, pentane, petroleum ether, propanol, propylene carbonate, pyridine, terpineol, tetrahydrofuran (THF), texanol, toluene, triethyl amine, water, and xylene.

Non-limiting examples of surfactants that can be included within the raw material used in the process 400 include any of the following: anionic types (carboxylates, phosphate esters, sulfonates, petroleum sulfonates, alkylbenzenesulfonates, naphthalenesulfonates, olefin sulphonates, alkyl sulfates, sulfates, sulfated natural oils & fats, sulfated esters, sulfated alkanolamides, alkylphenols, ethoxylated and sulfated, etc.), nonionic types (ethoxylated aliphatic alcohol, polyoxyethylene surfactants, carboxylic esters, polyethylene glycol esters, anhydrosorbitol ester and ethoxylated derivatives, glycol esters of fatty acids, carboxylic amides, monoalkanolamine condensates, polyoxyethylene fatty acid amides, etc.), cationic types (quaternary ammonium salts, amines with amide linkages, polyoxyethylene alkyl and alicyclic amines, n,n,n',n' tetrakis substituted ethylenediamines, 2-alkyl-1-hydroxethyl-2-imidazolines, etc.), and amphoteric types (n-coco-3-aminopropionic acid/sodium salt, n-tallow 3-iminodipropionate, disodium salt, n-carboxymethyl n-dimethyl n-9 octadecenyl ammonium hydroxide, n-cocoamidethyl n-hydroxyethylglycine, sodium salt, etc.).

The raw material also can include a mixture including the functional material, a dispersant, a binder, and a carrier. In some implementations, the raw material also can include one or more solvents. For example, a solvent can be added to the raw material to allow the raw material to flow at a temperature below the glass transition temperature of the polymers in the raw material. In some implementations, at least one component material of the raw material can be photosensitive to allow the resulting product material to be cured by light radiation.

The raw material can include a mixture including a polymer and at least one functional material selected based on one or more structural, electrical, thermal, and aesthetic properties. The functional material can have a first average particle size in the raw material. In some implementations, the primary particle size of the functional material in the raw material can be in the range of about 1 nanometer to about 100 microns. However, due to agglomeration, the average particle size of the functional material in the raw material can be significantly greater than the primary particle size of the functional material in the raw material. The functional material and polymer contained in the raw material can include any of the functional materials and polymers described above. For example, polymers in the raw material can include polyethylene, polypropylene, acetal, acrylic, nylon, polystyrene, polyvinyl chloride, acrylonitrile butadiene styrene and polycarbonate. Functional materials can include metals, ceramics, polymers, nanotubes, nanowires, nanoplatelets, and other materials.

Functional materials that may be included in the raw material mixture can include and of the materials discussed above. In some implementations, silver, silica, alumina, boron nitride, aluminum nitride, glass frit, graphene, graphite, palladium, ruthenium, gold, platinum, zirconia, and/or titania can be used as the functional material. These materials may be readily available in powder form. To form inks or pastes, these functional powder materials can be mixed, for example, with PVB, celluloses, poly(alkylene carbonate) copolymers, or PVA. The polymers can be dissolved in a compatible solvent, such as terpineol, texanol, toluene, MEK, propylene carbonate, glycol mixture, or water. To produce filaments, the functional powder materials can be mixed with acrylonitrile butadiene styrene (ABS), polylactic acid (PLA), polycarbonate (PC), polyamide (PA), polystyrene (PS), lignin, or rubber.

In some implementations, all of the component materials forming the raw material can be introduced to the cavitation machine substantially simultaneously. In addition, the components forming the raw material may be added to the cavitation machine prior to dispersion of the functional material within the raw material. Thus, the components of the raw material can all be introduced to the cavitation machine before any de-agglomeration or dispersion has been performed.

Because the second viscosity may be important for the raw material to be pushed into the cavitation, the fabrication methods described herein may further comprise determination of the suitable first pressure and first temperature so as to achieve the second viscosity. The determination may involve parametric studies and/or trial and errors. The determination may be optimized by using a certain algorithm or computer database containing material properties of the different constituent materials used in the raw material.

The first temperature and the first pressure are dependent on the processing conditions and material properties. In one implementation, the first temperature may be between about 20° C. and about 100° C.—e.g., between about 25° C. and about 80° C., between about 30° C. and about 60° C., between about 35° C. and about 50° C., between about 40° C. and about 50° C., etc. Other values are also possible, depending on the application.

In one implementation, the first pressure may be between 100 psi and about 100,000 psi—e.g., between 500 psi and about 80,000 psi, between 1,000 psi and about 50,000 psi, between 2.000 psi and about 10,000 psi, between 3,000 psi and about 5,000 psi, etc. Other values are also possible, depending on the application.

In one implementation of the method described herein, the first viscosity at room temperature may be at least about 1 Kcps—e.g., at least about 5 Kcps, about 10 Kcps, about 20 Kcps, about 40 Kcps, about 60 Kcps, about 80 Kcps, about 100 Kcps, about 150 Kcps, about 200 Kcps, about 250 Kcps, about 300 Kcps, about 350 Kcps, about 400 Kcps, about 500 Kcps, about 600 Kcps, about 700 Kcps, about 800 Kcps, about 900 Kcps, about 1000 Kcps, or higher. There is no upper limit for the first viscosity. There is also no lower limit for the first viscosity, as the methods and system described herein are equipped to handle the low viscosity materials that are processed by pre-existing cavitation techniques.

The second viscosity may generally be lower than the first viscosity due at least in part to the process of subjecting the raw material to the first temperature and the first pressure. The second viscosity varies with the material and also varies with the first pressure and the first temperature. For example, the second viscosity may be about 10% to about 90% of the first viscosity—e.g., about 20% to about 80%, about 30% to about 70%, about 40% to about 60%, about 45% to about 55%, etc. of the first viscosity. In one implementation, the second viscosity is about 25% to about 50% of the first viscosity.

The process 400 includes subjecting the raw material to a hydrodynamic cavitation process to produce a product material having a third viscosity, wherein the raw material is exposed to a second temperature while the raw material is subjected to the hydrodynamic cavitation process in the cavitation chamber (stage 410). In some implementations, the cavitation process applied to the raw material can effectively de-agglomerate the functional material while simultaneously dispersing the functional material throughout the product material. Simultaneous de-agglomeration and dispersion of functional material typically cannot be conducted using conventional technologies for preparing pastes for stereolithography. Conventional technologies, such as milling, can break aqueous emulsions, entrap bubbles, and breakdown long chain polymers, thereby producing inferior product material. As a result, the process for de-agglomerating functional material must be carried out separately from the process of dispersing the functional material. In contrast, the process 400 allows for de-agglomeration and dispersion of the functional material to be carried out in one step within the cavitation machine. In some implementations, a heating element in contact with the cavitation chamber can be used to heat the material in the cavitation chamber to a desired temperature.

The third viscosity (of the product material) may generally be lower than the first viscosity. The third viscosity varies with the material and also varies with the processing conditions the material has been subjected to. For example, the second viscosity may be about less than about 90% of the first viscosity—e.g., less than about 80%, about 75%, about 70%, about 65%, about 60%, about 55%, about 50%, about 45%, about 40%, about 35%, about 30%, or less. In one implementation, the third viscosity is equal to about 50% of the first viscosity. In some instances, the third viscosity is higher than the second viscosity once the pressure is released and/or the temperature of the product material is cooled.

The functional material within the product material can have a second average particle size, smaller than the first average particle size of the functional material within the raw material. For example, the cavitation process can breakdown agglomerates within the raw material, thereby reducing the average particle size. In some implementations, the average size of particles in the product material can be substantially the same as the primary particle size.

Figure 5B:
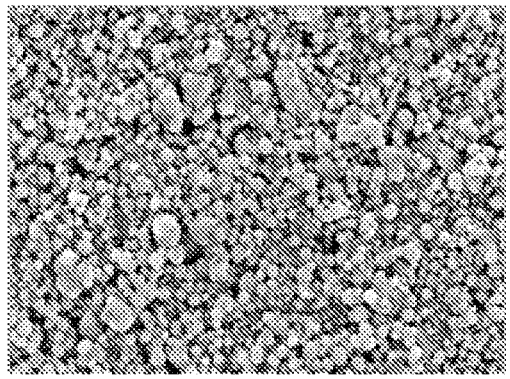
Figure 5C:
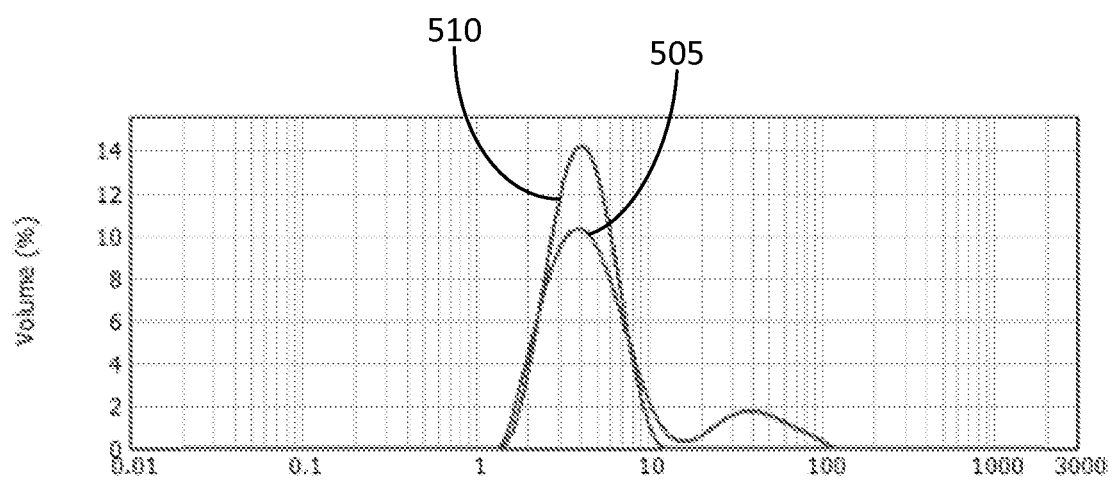
FIG. 5C illustrates particle size distribution for silver particles prior to a cavitation process ("raw material") and after a cavitation process ("product material"), according to an illustrative implementation.

FIG. 5B shows the contrast between particles before and after a raw material including silver particles has been subjected to the hydrodynamic cavitation process. As shown, the product material is substantially free of agglomerates. The particles have been dispersed such that no visually observable agglomeration of the particles is observed in the product material. FIG. 5C illustrates particle size distribution for the silver particles prior to a cavitation process ("raw material") and after a cavitation process ("product material"). The line labeled 505 represents the particle size distribution in the raw material, and the line labeled 510 represents the particle size distribute after the raw material has been cavitated to produce a product material. As shown, the nominal size of the particles in the raw material is about 4 microns, but the raw material also includes agglomerates (i.e., 2% of the product material) having a nominal size of about 13 microns. After the cavitation process is applied to the raw material, the resulting product material has a nominal particle size of about 4 microns and has been effectively de-agglomerated.

Figure 6B:
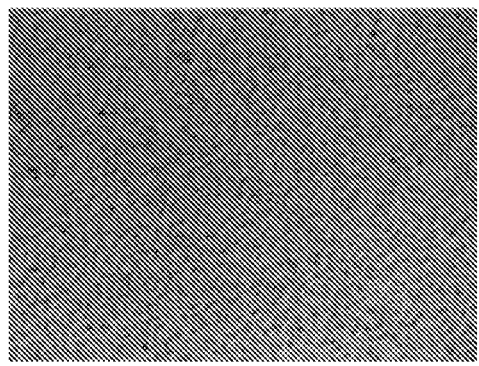
Figure 6C:
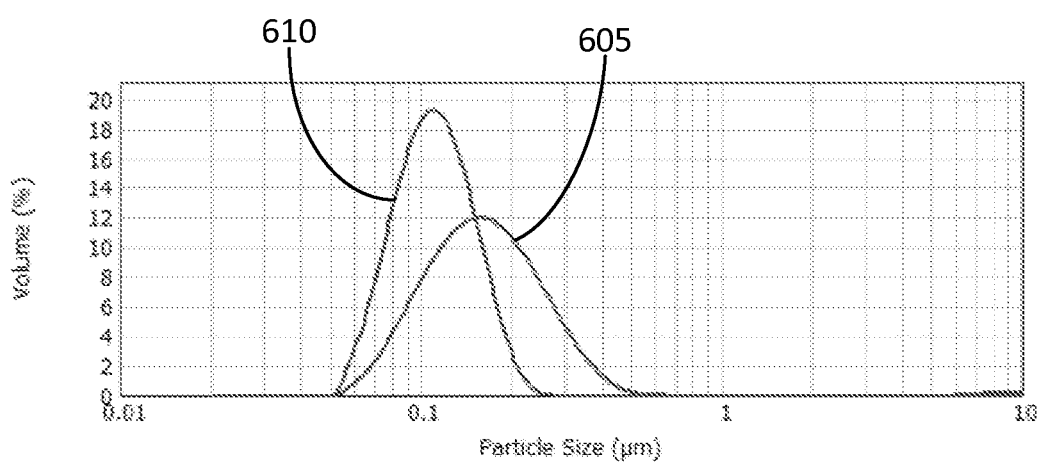
FIG. 6C illustrates particle size distribution for silica particles prior to a cavitation process ("raw material") and after a cavitation process ("product material"), according to an illustrative implementation.

FIG. 6B shows the contrast between particles before and after a raw material including silica particles has been subjected to the hydrodynamic cavitation process. As shown, the product material is substantially free of agglomerates. FIG. 6C illustrates particle size distribution for silica particles prior to a cavitation process ("raw material") and after a cavitation process ("product material"), according to an illustrative implementation. The line labeled 605 represents the particle size distribution in the raw material, and the line labeled 610 represents the particle size distribution after the raw material has been cavitated to produce a product material. As shown, the nominal size of the particles in the raw material is about 0.15 microns, and the maximum size is about 0.5 microns. After the cavitation process is applied to the raw material, the resulting product material has a nominal particle size of about 0.1 microns and a maximum particle size of about 0.25 microns.

Figure 7:
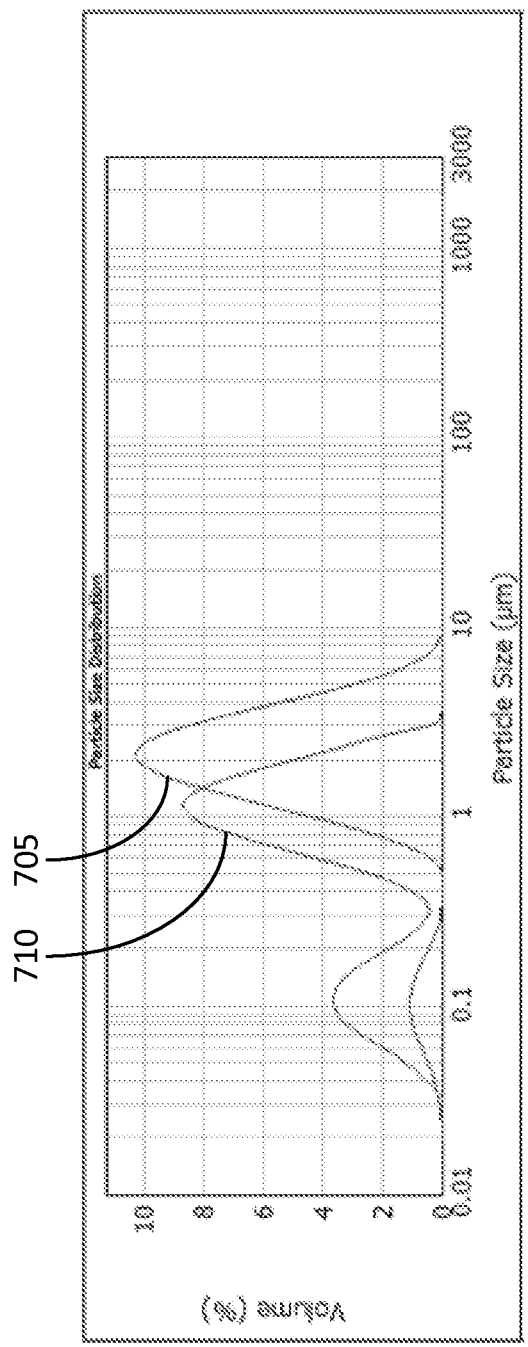
FIG. 7 illustrates particle size distribution for graphite particles prior to a cavitation process ("raw material") and after a cavitation process ("product material"), according to an illustrative implementation.

FIG. 7 illustrates particle size distribution for graphite particles prior to a cavitation process ("raw material") and after a cavitation process ("product"), according to an illustrative implementation. The line labeled 705 represents the particle size distribution in the raw material, and the line labeled 710 represents the particle size distribution after the raw material has been cavitated to produce a product material. As shown, the nominal size of the particles in the raw material is about 2 microns, and the maximum size is about 10 microns. After the cavitation process is applied to the raw material, the resulting product material has a nominal particle size of about 1 micron and a maximum particle size of about 3 microns.

Figure 8:
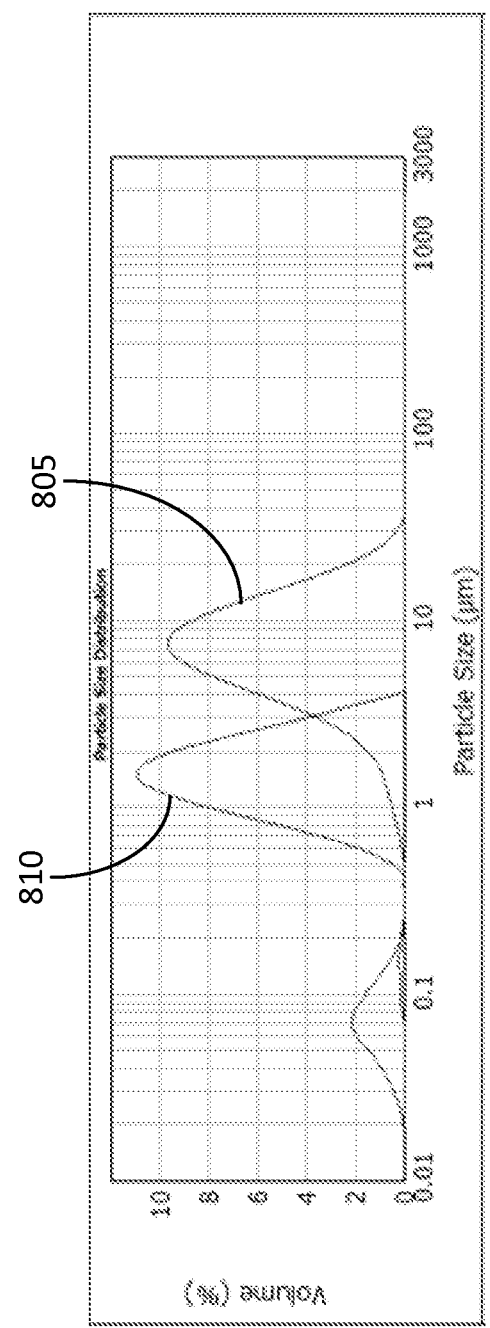
FIG. 8 illustrates particle size distribution for graphene particles prior to a cavitation process ("raw material") and after a cavitation process ("product material"), according to an illustrative implementation.

FIG. 8 illustrates particle size distribution for graphene particles prior to a cavitation process ("raw material") and after a cavitation process ("product material"), according to an illustrative implementation. The line labeled 805 represents the particle size distribution in the raw material, and the line labeled 810 represents the particle size distribute after the raw material has been cavitated to produce a product material. As shown, the nominal size of the particles in the raw material is about 8 microns, and the maximum size is about 13 microns. After the cavitation process is applied to the raw material, the resulting product material has a nominal particle size of about 1.5 microns and a maximum particle size of about 4 microns.

In some implementations, the apparatus systems described herein allow the raw material to undergo the cavitation process multiple times. For example, multiple passes through the cavitation machine may be useful in order to achieve a desired level of de-agglomeration or viscosity of the product material. In some implementations, the number of passes may be predetermined. In some implementations, the number of passes can be selected based on the size of the particles in the raw material, their concentration, their composition, and the properties of the surrounding matrix (e.g., the intermolecular forces between the particles, and between the particles and matrix). In some implementations, for particles having diameters greater than about 10 microns, one pass may be sufficient. For particles having diameters between about 1 and 10 microns, one to three passes may be sufficient. For particles having diameters between about 500 nanometers and 1 micron, two to four passes may be sufficient. For particles having diameters less than about 500 nanometers, five to seven passes may be sufficient. In some implementations, for a raw material including 60 wt % silver filled composite, three passes may be sufficient. For a raw material including 93% silver filled composite eight to ten passes may be required to completely de-agglomerate the particles. The number of passes required may also determine an amount of time to produce a given volume of product material. For example, in some implementations, the raw material is cavitated to produce the product material at a rate of about 0.25 liters per minute to about 6 liters per minute. Other rates may also be possible.

In some implementations, the process 400 also includes forming the product material into a desired shape (stage 425). In some implementations, the product material can be formed into a filament, for example using an extruder. The product material can be introduced into the hopper of an extruder, as discussed above in connection with FIG. 3A. In other implementations, extrusion equipment, such as a breaker plate, feedpipe, and die, can be incorporated directly into the cavitation machine and the product material can be fed directly from the cavitation machine into the feedpipe through the breaker plate.

In some implementations, the de-agglomeration achieved by the hydrodynamic cavitation process can allow for the fabrication of very small filaments. For example, because the average particle size of the product material can be very close to the primary particle size, the product material can be prevented from clogging the extrusion equipment during processing. In some implementations, the product material can be formed into a filaments having diameters in the range of about 100 nanometers to about 5 millimeters. For example, the product material can be formed into a filaments having diameters in the range of about 100 nanometers to about 1 micron, about 1 micron to about 500 microns, about 500 microns to about 1 millimeter, or about 1 millimeter to about 5 millimeters. Other shapes are also possible. For example, in some implementations, the product material can be formed into a hollow tube or a sheet.

The process 400 also can include cooling the product material (stage 430). The product material can be cooled to a second temperature, lower than the melting temperature of the product material, after the product material has been formed into the desired shape. In some implementations, the product material can be cooled by an air fan cool-down mechanism or by a cooling bath. In some implementations, if the product material has been formed into one or more filaments, the cooled product material filament can then be wound into a spool for use in a fused filament fabrication process. In some implementations, the product material can be cooled to a temperature in the range of about 20 degrees Celsius to about 100 degrees Celsius. In some implementations, the rate of cooling can be selected to achieve desired material properties for the product material, such as the degree of crystallinity in thermoplastic materials. The interaction between the powders and/or particulates in the product material can also affect the crystallinity of the product material. These and other factors can be used, for example, to determine an appropriate bath temperature to control the kinetics of cooling. Cooling times may vary depending on the properties of the product material. For example, a product material having a relatively high thermal conductivity may cool more quickly than a product material having a relatively low thermal conductivity.

The process 400 also can include drying the product material to remove solvent (stage 425). Drying of the product material can be facilitated by subjecting the product material to temperatures and pressures selected to achieve a desired drying time. During the drying process, the solvent can be evaporated to produce a powder material suitable for use in selective laser sintering fabrication. In some implementations, the product material can be dried using heat (e.g., conduction or convection drying), vacuum drying, or radiation drying (e.g., infrared, microwave, etc.).

Applications

The product material produced by the methods and systems described herein may be employed in a variety of applications. For example, the product materials may be used to form multilayer electronic devices using the additive manufacturing techniques described above. In one implementation, a process similar to the process 400 shown in FIG. 4 can be used to produce two separate product materials. A first product material can be an electrically conductive powder, while a second product material can be electrically an insulating powder.

A layer of the insulating powder can be cured in a blanket form. Next, a layer of the conductive powder can be drawn across the surface of the cured insulating power, and a desired pattern can be traced with a laser to cure the conductive powder. In some implementations, the conductive powder can be cured to form electrical traces. The non-sintered conductive powder can be brushed away, and replaced with a layer of the insulating powder to fill in the areas not covered by the cured conductive powder. The insulating powder can subsequently be cured, and the process can be repeated layer by layer. One significant advantage of such a technique is that different heating rates and conditions that can be used to sinter the insulating powder and the conductive powder. This can eliminate a lot of challenges associated with conventional technologies which are hindered by differential onsets of sintering, and sintering rates. Similar principles can also be applied to produce multilayer electronic devices using stereolithography or fused filament fabrication. For example, instead of depositing powders and curing with a laser or electron beam, a photocuring resin could be used, or the layers could be extruded using filaments filled with the functional material that are either insulating or conductive. Once the electronic device is cured, the structure can be loaded into a furnace for binder burnout and additional sintering. Devices fabricated according to these techniques can be useful in Scaffolds for tissue engineering, time released drugs, prosthetics, dental devices, firearms/projectiles, sensors, communication devices, microprocessors, engines/turbines, structural elements for automobiles and spacecraft, foods/pastries, children's toys, clothing, musical instruments, drones, etc.

ADDITIONAL NOTES

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various implementations and examples, it is not intended that the present teachings be limited to such implementations or examples. On the contrary, the present teachings encompass various alternatives, modifications, and equivalents, as will be appreciated by those of skill in the art.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described implementations of the invention may be implemented in any of numerous ways. For example, some implementations may be implemented using hardware, software or a combination thereof. When any aspect of an implementation is implemented at least in part in software, the software code may be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various implementations of the technology discussed above. The computer readable medium or media may be transportable, such that the program or programs stored thereon may be loaded onto one or more different computers or other processors to implement various aspects of the present technology as discussed above.

The terms "program" or "software" are used herein in a generic sense to refer to any type of computer code or set of computer-executable instructions that may be employed to program a computer or other processor to implement various aspects of the present technology as discussed above. Additionally, it should be appreciated that according to one aspect of this implementation, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various implementations.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed:

1. A method comprising:
preparing a raw material including a mixture comprising a polymer and a functional material selected based on at least one of a structural property, and electrical property, a thermal property, and a color, wherein the functional material has a first average particle size in the raw material;
heating a chamber of a cavitation machine to a first temperature selected to be greater than a melting temperature of the raw material;
introducing a volume of the raw material into the chamber of the cavitation machine;
applying a hydrodynamic cavitation process to the raw material to produce a product material, wherein the functional material has a second average particle size, smaller than the first average particle size, in the product material;
forming the product material into a desired shape by forcing the product material through an extruder, wherein the desired shape comprises a filament; and
cooling the product material to a second temperature selected to be lower than the melting temperature of the product material.

2. The method of claim 1, wherein the filament has a diameter in the range of 100 nanometers to 1 micron.

3. The method of claim 1, wherein the filament has a diameter in the range of 1 micron to 500 microns.

4. The method of claim 1, wherein the filament has a diameter in the range of 500 microns to 1 millimeter.

5. The method of claim 1, wherein the filament has a diameter in the range of 1 millimeter to 5 millimeters.

6. The method of claim 1, further comprising feeding the product material directly from the cavitation chamber through a breaker plate of the extruder and into a feedpipe of the extruder.

7. The method of claim 1, further comprising winding the filament into a spool.

8. The method of claim 1, further comprising repeating, at least once, applying the hydrodynamic cavitation process to the product material.

9. The method of claim 1, wherein the functional material has a primary particle size in the range of 1 nanometer to 100 microns.

10. The method of claim 1, wherein the polymer of the raw material comprises at least one of acrylonitrile butadiene styrene (ABS), polylactic acid (PLA), polycarbonate (PC), polyamide (PA), polystyrene (PS), lignin, or rubber.

11. The method of claim 1, wherein the second temperature is between 20 degrees Celsius and 100 degrees Celsius.

12. The method of claim 1, wherein cooling the product material to the second temperature comprises cooling the product material using at least one of an air fan cool-down mechanism or by a cooling bath.

13. The method of claim 1, further comprising drying the product material to remove a solvent from the product material.

14. The method of claim 13, wherein drying the product material comprises drying the product material using at least one of conduction drying, convection drying, vacuum drying, or radiation drying.

15. The method of claim 1, wherein heating the chamber of the cavitation machine comprises heating the chamber of the cavitation machine to the first temperature selected to be greater than the melting temperature of the raw material using a heating element.

16. The method of claim 1, wherein cooling the product material to the second temperature comprises cooling the product material to the second temperature using at least a feedback temperature control.

* * * * *